Inventor:
Marcel Le Masson
by Connolly Bros
Atty

Patented Dec. 28, 1937

2,103,426

UNITED STATES PATENT OFFICE 2,103,426

GRILLING AND TOASTING DEVICE

Marcel Le Masson, Paris, France

Application April 26, 1935, Serial No. 18,458
In France April 27, 1934

1 Claim. (Cl. 53—5)

The matter of this invention is a gridiron like appliance which can be used for grilling every kind of meat or fish, for toasting bread, etc.

The device substantially consists of a solid sheet metal screen on which is superimposed a wire cloth grid, the distance between which two members can be variable, as will be described. The whole device is designed so as to secure the following advantages:

1. The device prevents the meat or other food from contact with flame or smoke which would impart a bad taste to it.

2. The screen used for preventing any contact with flame or smoke is flat and made from very thin sheet metal, so that it does not interfere in any way with the special "grilling" or "toasting" effect of intense heat; of addition, said grilling effect is more uniform than with the conventional grid iron; and, above all, owing to the comparatively small section of the wires which form the grid, the meat or other food laid on the grid will not "bake" on the wires, that is, stick to the same.

3. The device, when used for grilling, collects the gravy and the fat without the slightest loss. Nothing will drip into the fire to produce flame and fumes. The removal of the gravy is facilitated by a spout.

4. The wire cloth surface which accommodates the commodity to be grilled is exchangeable, so that the user can have one grid for meat and one for fish, for instance and thus avoid imparting to grilled meat the bad taste and smell which are retained, notwithstanding every precaution, by utensils having been in contact with fish.

5. The intensity of the heat acting upon the meat, fish, bread, etc., can be varied by varying the distance between the grid (also called hereinafter "carrying member") and the screen (also called hereinafter "hot plate"), this being achieved by means of suitable guides or slides provided on the screen for accommodation of the grid.

6. The grilling process can be controlled at will by rotating the grid with respect to the screen, so that all parts of the piece of meat etc. can be brought successively above the hottest place of the screen. This is achieved by means of the slides, in which the grid can be rotated freely, and the provision of a handle whose shape and arrangement make it possible to swing it across the slides and thus enable the grid to be rotated by a full revolution without the slides interfering.

7. By the use of several wire cloth grids of different curvatures, it is possible to provide a versatile utensil, which lends itself to many culinary uses.

Figure 1:
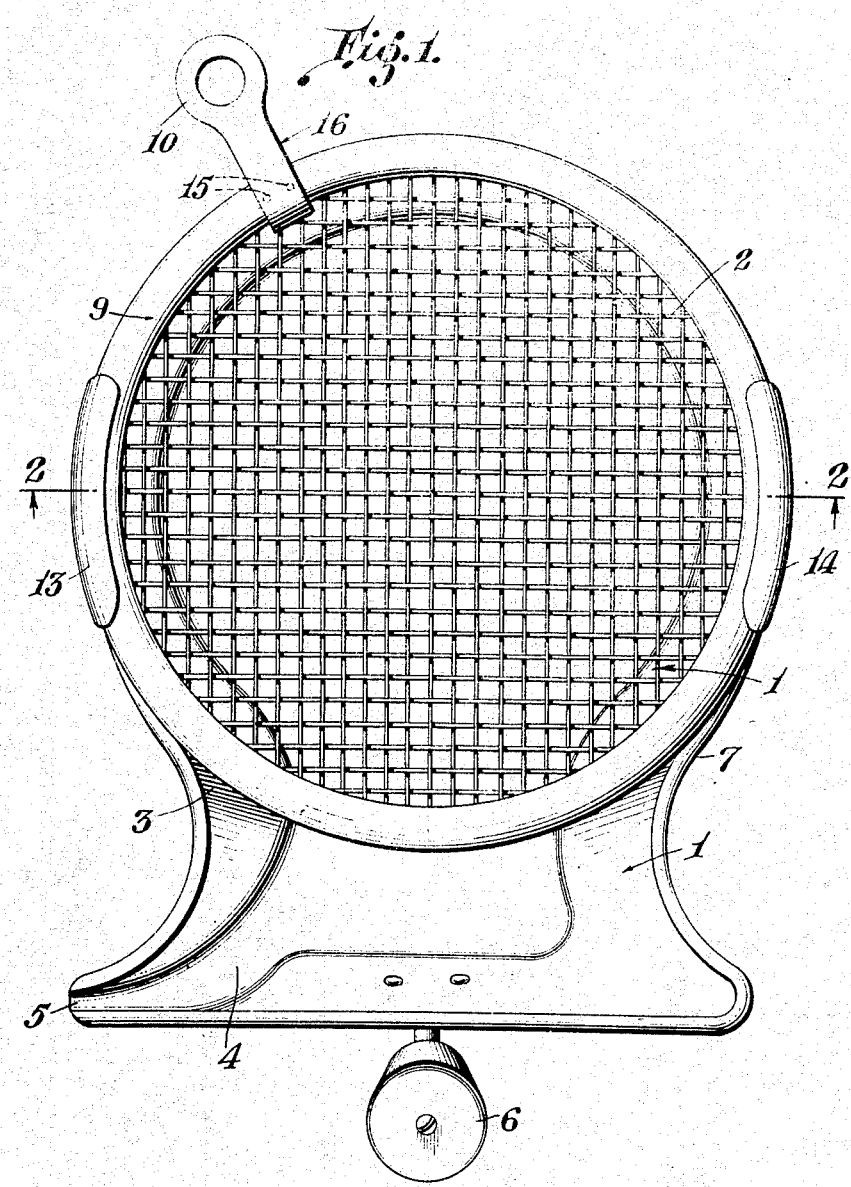

A form of the invention is shown, as a matter of example, by the accompanying drawing, in which:

Fig. 1 is a plan view of the device.

Figure 2:
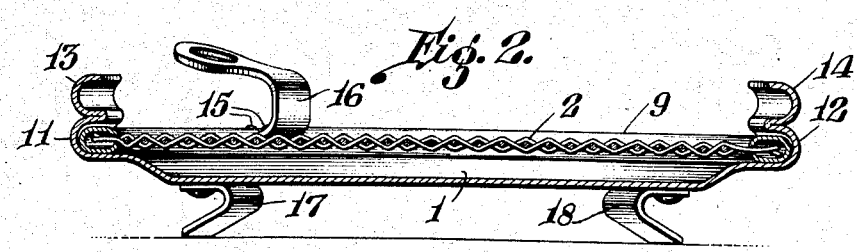

Fig. 2 a cross-section through A—A of Fig. 1.

One of the essential components of the appliance is the screen or hot plate 1, made of thin sheet metal. The body of the plate is preferably of semi-circular shape, and is extended outwardly by a surface whose width is about equal to the diameter of the said semi-circle; that part ends in the shape of a small trough 4 for the gravy and fat. This trough is provided with a spout 5 for easy removal of the gravy. The screen is provided with a handle conveniently made of wire, which makes it possible to handle and carry the device.

The said screen or hot plate is flat, with a slightly raised and beaded border 7. The grid, of circular shape, rests on the said border 7, and accommodates the meat, bread or other commodity. The wire cloth for the grid may, for instance, consist of Nr 18 or Nr B. & S. gauge wires, arranged so as to form square meshes about $\frac{1}{16}''$ x $\frac{1}{16}''$ size or so. The periphery of the wire cloth disc is reinforced by a sheet-metal ring 9 spun over it. In addition the grid is fitted with a handle 10, or with a suspension ring. The grid is connected to the screen 1 by two lateral guides 11 and 12 integral with the latter, the said guides being formed by bending the sheet metal on the border of the screen. These guides accommodate the grid with ample clearance, so that the grid may be inserted freely into the guides or removed freely therefrom.

Supplementary guides, 13—14 may be formed on the edges of the screen as shown in Fig. 2, to enable the grid to be adjusted to different distances from the screen.

It should be understood that any other kind of wire cloth may be used, for instance with hexagonal meshes instead of square meshes, etc.

The inside end of the handle of the grid is clamped in the fold of the reinforcing ring 9 and further secured by two rivets 15. It is bent, at 16, in order that it may be swung over the guides 13—14 when the grid is being rotated, without the guides interfering with that motion.

The said handle is used for rotating the grid on the screen in order that all parts of the meat or other article be successively exposed to the hottest part of the screen. The grilling or toasting process can thus be controlled efficiently.

The screen I is provided with two feet or legs 17, 18, made of metal strip, which can be bent to the required extent, in order to adjust the inclination or slope of the grid when the device is put on the stove or burner.

An outstanding advantage of the appliance described is the low cost of the circular grid, which enables the user of the appliance to buy a number of these grids and reserve each one for a definite purpose, for instance, the user can have a number of grids especially reserved for fish.

In addition, the user who has a set of grids is in a position to turn the meat upside down, during the grilling process without any direct manipulation. For that purpose, he withdraws the grid which is engaged in the appliance and carries the meat; puts another grid onto the meat, turns the whole upside down, after which the lower grid, which now carries the meat, can be returned onto the screen and positioned in the slides.

The wire cloth grid is also of decided advantage for pastry-baking. Wire cloth is as good a support for pastry as is sheet metal, but without the inconveniences of the latter.

The grid, either made of wire cloth or perforated metal sheet, may have a slight curvature, which is of advantage for various purposes, more especially for roasting coffee, peanuts, grain and similar articles.

The invention thus provides a versatile and quite serviceable appliance, which can be used at will as griller, toaster grid, draining plate, dishcover, etc.

Having now particularly described and ascertained the nature of my said invention and in what manner the same is to be performed I declare that what I claim is:

A toasting and grilling device of the character described, comprising a shallow pan of thin sheet metal constituting a screen having supporting legs and having upturned walls formed with guiding flanges on the edges thereof and a grid member rotatably mounted on said pan and slidably insertable into and out of said guiding flanges, said grid member being adjustably mounted and adapted to be located at different distances from said screen.

MARCEL LE MASSON.